(12) United States Patent
Liu et al.

(10) Patent No.: US 11,828,894 B2
(45) Date of Patent: Nov. 28, 2023

(54) MULTI-SCALE UNSUPERVISED SEISMIC VELOCITY INVERSION METHOD BASED ON AUTOENCODER FOR OBSERVATION DATA

(71) Applicant: SHANDONG UNIVERSITY, Shandong (CN)

(72) Inventors: Bin Liu, Jinan (CN); Yuxiao Ren, Jinan (CN); Peng Jiang, Jinan (CN); Senlin Yang, Jinan (CN); Qingyang Wang, Jinan (CN); Xinji Xu, Jinan (CN); Duo Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/031,289

(22) PCT Filed: Dec. 14, 2021

(86) PCT No.: PCT/CN2021/137890
§ 371 (c)(1),
(2) Date: Apr. 11, 2023

(87) PCT Pub. No.: WO2023/087451
PCT Pub. Date: May 25, 2023

(65) Prior Publication Data
US 2023/0305177 A1    Sep. 28, 2023

(30) Foreign Application Priority Data

Nov. 19, 2021    (CN) .......................... 202111400849.4

(51) Int. Cl.
*G01V 1/30* (2006.01)
(52) U.S. Cl.
CPC ...... *G01V 1/303* (2013.01); *G01V 2210/6222* (2013.01); *G01V 2210/66* (2013.01)

(58) Field of Classification Search
CPC ........... G01V 1/303; G01V 2210/6222; G01V 2210/66; G06F 30/27; G06N 3/04
See application file for complete search history.

(56) References Cited

U.S. PATENT DOCUMENTS

| | | | |
|---|---|---|---|
| 8,688,616 B2 * | 4/2014 | Fernandez | G06N 7/01 706/52 |
| 10,527,699 B1 * | 1/2020 | Cheng | G06N 3/088 |

(Continued)

FOREIGN PATENT DOCUMENTS

| | | |
|---|---|---|
| CN | 111562611 A | 8/2020 |
| CN | 111723329 A | 9/2020 |

(Continued)

OTHER PUBLICATIONS

Jul. 27, 2022 International Search Report issued in International Patent Application No. PCT/CN2021/137890.

(Continued)

*Primary Examiner* — Elias Desta
(74) *Attorney, Agent, or Firm* — Oliff PLC (57) ABSTRACT

A multi-scale unsupervised seismic velocity inversion method based on an autoencoder for observation data. Large-scale information is extracted by the autoencoder, which is used for guiding an inversion network to complete the recovery of different-scale features in a velocity model, thereby reducing the non-linearity degree of inversion. A trained encoder part is embedded into the network to complete the extraction of seismic observation data information at the front end, so it can better analyze the information contained in seismic data, the mapping relationship between the data and velocity model is established better, then the inversion method is unsupervised, and location codes are added to the observation data to assist the network in perceiving the layout form of an observation system, which facilitates practical engineering application. Thus a rela- (Continued)

tively accurate inversion result of the seismic velocity model when no real geological model serves as a network training label can be achieved.

14 Claims, 4 Drawing Sheets

(56) References Cited

U.S. PATENT DOCUMENTS 10,572,800 B2 * 2/2020 Wang ..................... G06N 3/08
2020/0183041 A1 6/2020 Denli et al.

FOREIGN PATENT DOCUMENTS

| CN | 112444850 A | 3/2021 |
|----|-------------|--------|
| CN | 113176607 A | 7/2021 |

OTHER PUBLICATIONS

Jul. 27, 2022 Written Opinion of the International Searching Authority issued in International Patent Application No. PCT/CN2021/137890.

* cited by examiner

MULTI-SCALE UNSUPERVISED SEISMIC VELOCITY INVERSION METHOD BASED ON AUTOENCODER FOR OBSERVATION DATA

TECHNICAL FIELD

The present disclosure belongs to the technical field of geophysical exploration, and particularly relates to a multi-scale unsupervised seismic velocity inversion method based on an autoencoder for observation data.

BACKGROUND

The description in this section merely provides background information related to the present disclosure and does not necessarily constitute the prior art.

The seismic exploration technology plays an important role in exploration of oil and gas resources, coalfield exploration, detection of adverse geology in tunnels, and other practical production. The basic operating principle of reflection wave seismic exploration is to excite seismic waves via an artificial seismic source, and the seismic waves will be reflected when encountering a rock stratum partition surface or geological structure, and these seismic wave signals containing geological information are then received by receivers laid on the ground and used for subsequent processing and interpretation to determine the location and geological condition of the structure. In order to achieve high accuracy and high resolution imaging of complex geological structures, Full Waveform Inversion (FWI) is an accepted velocity inversion method in the field of seismic detection, which uses all the waveform information in the seismic record to iteratively optimize the model parameters, and is essentially a local optimization algorithm to solve the seismic data fitting problem. The mapping between seismic data and a seismic velocity is strongly non-linear, which results in high dependence on an initial velocity model for a full waveform inversion result. The initial model is generally established based on human experience, and an initial velocity model that differs significantly from the real-world situation can easily lead to a local minimum value of the inversion result, seriously affecting the accuracy of the inversion result.

In order to get rid of FWI's need for the initial model, some researchers proposed a multi-scale inversion idea to reduce the non-linear degree of inversion. By extracting low-frequency information in the seismic data, the multi-scale seismic full waveform inversion firstly inverts large-scale structures in the corresponding velocity model thereof, and then gradually inverts small-scale fine structures in the velocity model by using higher-frequency information, which avoids the need for the initial model. For example, Yuqing Chen and Erdinc Saygin introduced the autoencoder in deep learning to extract the information in the observation data through the structure, which replaces the link of extracting the information in the observation data through a filtering algorithm in traditional multi-scale seismic full waveform inversion, and also achieves the effect of FWI to get rid of the dependence on the initial model. In addition to the improvement of a traditional FWI method using a deep learning algorithm, in view of the high-precision simulation capacity on strong non-linear mapping exhibited by the deep learning algorithm, a seismic velocity inversion network based on a variety of deep neural networks, such as a fully connected network, a convolutional neural network, an adversarial neural network and so on, has achieved effective inversion of relatively complex velocity models in numerical experiments, and exhibited a velocity inversion effect superior to that of traditional FWI.

However, the above-mentioned deep learning seismic velocity inversion method still meets issues. At present, most of the direct seismic velocity inversion methods based on deep learning need to be driven relying on data, which belongs to the category of supervised learning or semi-supervised learning, and only a few unsupervised methods exist. Supervised learning or semi-supervised learning is used for training the deep neural network, which depends on the real velocity model completely or partially as a label of seismic observation data inversion, and the label plays a guiding role in the inversion process. In practice, it is very difficult to obtain actual velocity distribution and construct a corresponding training data set. An unsupervised inversion method based on a background velocity exists, and the method reduces the degree of non-linear mapping in the inversion process by adding an apriori large-scale background velocity model to the network. Therefore, the method needs a large-scale background velocity model corresponding to the actual observation data and similar to the real velocity model, and the process of obtaining the background velocity model is relatively complex. The method depends on relatively accurate apriori information to some extent, otherwise the mapping of the observation data to the velocity model cannot be established directly. In addition, the current deep learning seismic inversion methods have strict requirements for the layout form of the observation system of data input into the network. Because the current seismic inversion network cannot perceive the location information of shot points and receiver point of observation data, and the same observation system needs to be used to collect the observation data, which is strict to application conditions in practice. Therefore, the practical application of existing seismic deep learning inversion methods is still very difficult.

To realize the unsupervised learning seismic velocity inversion method which can be applied to practical engineering, there are still three problems as follows.

Firstly, the problem is how to deal with high non-linearity and difficulty in the deep learning seismic velocity inversion process under the unsupervised learning condition. It is a strong non-linear inversion task to obtain the actual underground velocity model directly from the observation data, which is ill-posed, and the mapping relationship is very complex. In addition, the seismic deep learning inversion method needs to complete the inversion task for seismic data collected from different areas under the same network structure and parameters. If the velocity information of the real model is not provided, it is very difficult to directly establish the mapping task from the observation data to the underground velocity model.

Secondly, if we don't rely on a relatively accurate velocity priori, the problem is what information could be relied on and what measures could be taken to achieve unsupervised learning seismic velocity inversion. In the existing supervised and semi-supervised methods of deep learning, the real underground velocity model is needed as the label data, and the label plays a guiding role in all the above methods, and is difficult to obtain in practice. Based on the apriori condition of the background velocity model, the existing unsupervised method uses the observation data obtained by performing wave equation forward modeling on the predicted model and the actual data as the residual to drive the network training process. In theory, under the condition of completely getting rid of the label data and relatively accurate apriori knowledge of the velocity, it is very difficult to get reliable inversion results when the residual of the observation data solved by using the physical law of the wave equation directly guides the deep learning network to directly invert the velocity model, and how to guide the unsupervised method becomes a problem that needs to be solved.

Thirdly, for the seismic inversion method based on deep learning, the problem is how to make the deep neural network match the seismic data from different observation setups. For seismic records collected from different periods of the same project or different projects using different observation setups, the deep neural network cannot perceive the relationship and location information of each trace in the seismic data. The input data of current deep learning seismic inversion methods need to be in the same observation setup. This makes the application of deep learning seismic inversion methods in practical engineering difficult.

SUMMARY

In order to solve the above-mentioned problems, the present disclosure proposes a multi-scale unsupervised seismic velocity inversion method based on an autoencoder for observation data. In the present disclosure, large-scale information in the data is extracted by the autoencoder for the observation data, and the information is used for guiding an inversion network to complete the recovery of different-scale features in a velocity model, thereby reducing the non-linearity degree of inversion. On this basis, the trained encoder part of the autoencoder for observation data is embedded into the inversion network to complete the effective extraction of seismic observation data information at the front end of the inversion network. The inversion network can better analyze the information contained in seismic data, the mapping relationship between the seismic data and the velocity model is established better. Then the inversion method is completely unsupervised way, and location codes are added to the observation data input into the network to assist the network in perceiving the layout form of an observation system, which facilitates practical engineering application. This method can achieve a relatively accurate inversion result of the seismic velocity model when no real geological model serves as a network training label.

According to some embodiments, the following technical solutions are adopted in the present disclosure:

A multi-scale unsupervised seismic velocity inversion method based on an autoencoder for observation data includes:

constructing the corresponding geological velocity models according to the actual geological conditions, calculating corresponding simulated seismic observation data by numerical simulation, and based on each seismic observation data and the geological velocity model, forming an unsupervised seismic velocity inversion database;

training a plurality of autoencoders by using the simulated seismic observation data, the different autoencoders encoding global key information in the seismic observation data into low-dimensional vectors of different lengths, a number of parameters of all the above vectors being less than that of the seismic observation data, and the vector with a smaller number of parameters corresponding to larger-scale information in the velocity model;

adding a location feature information code to each seismic trace of actual observation data, the code being used for determining location information (the locations of seismic sources and receivers) of seismic observation data of each trace;

constructing a convolutional-fully connected network, embedding each trained encoder part of the autoencoder for observation data into the front end of the above-mentioned network structure, so that an inversion network can effectively extract global information of the observation data at an input end of the seismic data, inputting the seismic observation data encoded by the location feature information into the convolutional-fully connected network, and outputting a predicted velocity model corresponding to the seismic observation data;

constructing a forward modeling network of wave equation to transform the predicted velocity model into corresponding predicted observation data;

calculating a residual of the predicted observation data and the simulated seismic observation data; respectively inputting the predicted observation data and the simulated seismic observation data into each trained encoder part of the autoencoder for observation data to respectively obtain encoded low-dimensional vectors and calculate a residual of each low-dimensional vector; calculating a residual of a linear gradient velocity model and the predicted velocity model output by the inversion network;

summing the three residuals according to the proportion changing with the number of training rounds and then forming a multi-scale unsupervised loss function, guiding the network to recover different-scale information in the velocity model at different training stages, and updating parameters of the convolutional-fully connected network by means of gradient pass back of the loss function; and using the convolutional-fully connected network with the updated parameters to process field observation data to obtain an inversion result.

As an alternative implementation, when the corresponding geological velocity models are constructed according to the actual geological conditions, wavefield simulation is performed for each geological velocity model with the fixed location of seismic sources and receivers, as well as observation time, and field data is recorded at the receiver locations to obtain actual seismic data corresponding to the geological velocity models.

As an alternative implementation, when corresponding seismic observation data is calculated, the corresponding simulated seismic observation data is calculated by using a wave equation.

As an alternative implementation, actual observation data is self-encoded by a plurality of regularization autoencoders, an encoder part output of the regularization autoencoder consisting of a vector with a number of parameters lower than that of the seismic observation data, and the vector containing global key information in the seismic observation data and corresponding to large-scale information in the velocity model.

As an alternative implementation, a trigonometric function encoded location feature is added to each seismic trace of the actual observation data, the location feature information code being two numerical values solved by a formula composed of a sine-cosine function input through a shot point of the seismic trace and a receiver location and can realize the calibration of any location of seismic sources and receivers.

As an alternative implementation, the convolutional-fully connected network includes a feature encoder, a feature generator and a feature decoder, each encoder part of the autoencoder for observation data forming the feature encoder together with other network structures, and the network being used for establishing mapping of observed seismic observation data to the velocity model.

As a further limited implementation, the encoder includes a global feature encoder and a neighborhood information encoder, the observation data input into the network is respectively input to the above two parts, and outputs of the two parts are input to the feature generator after being spliced; and the global feature encoder is each encoder part of the autoencoder for observation data, and the neighborhood information encoder consists of a 3-layer successively cascaded convolutional structure.

As a further limited implementation, the feature generator includes 5 fully connected layers, an input of the feature generator being an output of the encoder, and an output of the feature generator being an input of the feature decoder.

As a further limited implementation, the feature decoder includes a 6-layer successively cascaded convolutional structure, wherein the 4th-layer convolutional structure is 4 parallel convolutional layers.

As an alternative implementation, in the specific process of constructing the forward modeling network of the wave equation to transform the predicted velocity model into the corresponding seismic observation data: constructing the forward modeling network of the wave equation based on the deep neural network, and performing forward modeling of a seismic wavefield on a final output of the convolutional-fully connected network so that the seismic observation data corresponding to the predicted velocity model is obtained.

As a further limited implementation, the specific process of constructing the forward modeling network of the wave equation based on the deep neural network includes: in a time-space domain, discretizing a constant density acoustic wave equation, the process of the seismic wavefield propagating with time being based on the iterative process of a forward operator in the discretized equation; and taking seismic wavefield propagation operation at each time step as a layer of deep neural network, taking the seismic velocity model as a trainable parameter of the deep neural network, and taking convolution operation in the wavefield propagation process and simple operation between corresponding elements of a matrix as the internal operation process of the network to realize construction of the forward modeling network of the wave equation. For each network layer of the forward modeling network of the wave equation, a seismic wavefield of the first two moments is taken as an input, and a wavefield of the next moment and the corresponding observation data are obtained by introducing a seismic source wavefield of the current moment.

As an alternative implementation, is a weight coefficient changing with the number of training rounds respectively added to the residual of the observation data, the residual of the low-dimensional vector and the residual of the linear model constituting the loss function. The three residuals respectively contain small-scale information, large-scale information of different degrees and basic apriori information.

As a further limitation, a gradually increasing weight coefficient is added to the residual of the observation data, and a gradually decreasing weight coefficient is added to the residual of the low-dimensional vector and the residual of the linear model, so as to guide the network to take the large-scale information of an inversion model as a target at the initial stage of training, and take a fine structure of an inversion model as a target at the middle and later stages of the training process.

A multi-scale unsupervised seismic velocity inversion system based on an autoencoder for observation data includes:

an inversion database constructing module, configured to construct corresponding geological velocity models according to the actual geological conditions, calculate corresponding seismic observation data, and based on each seismic observation data and the geological velocity model, form an unsupervised seismic velocity inversion database;

an autoencoder for observation data module, configured to train a plurality of autoencoders by using the simulated seismic observation data, the different autoencoders encoding global key information in the seismic observation data into low-dimensional vectors of different lengths, a number of parameters of the above vectors being less than that of the seismic observation data, and the vector with a smaller number of parameters corresponding to larger-scale information in the velocity model;

a predicted velocity model constructing module, configured to add a location feature information code to each seismic trace of actual observation data, the code being used for determining location information of observation data of each trace; construct a convolutional-fully connected network, and embed each trained encoder part of the autoencoder for observation data into a front end of the above-mentioned network structure; input the seismic observation data encoded by the location information into the convolutional-fully connected network, and output a predicted velocity model corresponding to the seismic observation data;

a transforming module, configured to construct a forward modeling network of wave equation to transform the predicted velocity model into corresponding seismic observation data;

a parameter updating module, configured to calculate a residual of predicted observation data and the simulated seismic observation data; respectively input the predicted observation data and the simulated seismic observation data into each trained encoder part of the autoencoder for observation data to respectively obtain encoded low-dimensional vectors and calculate a residual of each low-dimensional vector; calculate a residual of a linear gradient velocity model and the predicted velocity model output by an inversion network; sum the above three residuals according to the proportion changing with the number of training rounds and then forming a multi-scale unsupervised loss function, guide the network to recover different-scale information in the velocity model at different training stages, and update parameters of the convolutional-fully connected network by means of gradient pass back of the loss function; and a velocity inversion module, configured to use the convolutional-fully connected network with the updated parameters to process field observation data to obtain an inversion result.

A computer-readable storage medium is provided, storing a plurality of instructions, the instructions being adapted to be loaded and executed by a processor of a terminal device to perform the step of the foregoing method.

A terminal device, including a processor and a computer-readable storage medium, the processor being configured to implement each instruction; and a computer-readable storage medium, storing a plurality of instructions, the instructions being applicable to being loaded and executed by a processor to perform the step of the foregoing method.

Compared with the prior art, the present disclosure has the beneficial effects.

Directing at the problems that the mapping from the observation data to the velocity model in the deep learning seismic velocity inversion method has strong non-linearity, the high difficulty of an inversion task causes that it is difficult for an algorithm to get rid of the need for the label data, i.e. the need for a real velocity model, and it is difficult to realize unsupervised operation, the present disclosure proposes an unsupervised inversion strategy based on the autoencoder for the observation data. Based on the plurality of pre-trained autoencoders of the observation data, the global key information is extracted from the data to a low-dimensional vector space, and the information is used for recovering large-scale structural features in the geological model, which reduces the non-linearity and difficulty of the inversion task, and enables the algorithm to be completely unsupervised.

The present disclosure directly embeds partial structure of the autoencoder into the inversion network on the basis of each trained autoencoder for observation data, thereby effectively improving the performance of the inversion network structure itself. In the present disclosure, the feature encoder, the feature generator and the feature decoder are constructed by using the fully connected and convolutional neural network to form the inversion network, and each encoder part of the autoencoder for observation data is embedded into the feature encoder, so that the inversion network can effectively extract the global key information of the observation data at an input end of the seismic data, and it is easy for the neural network to learn a mapping relationship from the observation data to the velocity model.

Directing at the problems that network training of the existing seismic velocity deep learning inversion method relies on real velocity data or relatively accurate apriori information of the velocity, but the above-mentioned data is difficult to obtain in practical engineering or the process is complicated, the present disclosure forms the multi-scale unsupervised seismic velocity inversion method based on the autoencoder for the observation data, so as to get rid of the need for a real velocity model or relatively accurate apriori information of the velocity in the network training process of seismic velocity inversion.

Directing at the problem that reliable inversion results can hardly be obtained when the residual of the seismic observation data solved by using the physical law of the wave equation directly guides the deep learning network to directly invert the velocity model, the present disclosure forms the multi-scale unsupervised loss function based on the physical law of the wave equation by combining with the seismic observation data directly solved according to the physical law of the wave equation on the basis of the global key information extracted from the observation data by the autoencoder for observation data. The loss function combines the large-scale information extracted by the autoencoder with the small-scale information originally contained in the observation data, and fully fits the inherent characteristics of the process when the deep neural network learns the mapping relationship between images, i.e. the mapping of a large-scale structure in the image is established first and then the mapping of a small-scale structure is established, so that the loss function and the neural network achieve an efficient fit. The velocity unsupervised learning inversion scheme completely guided by the propagation law of the seismic wavefield is formed, and provides a feasible means for the application of deep learning inversion of the seismic velocity in practical data.

Directing at the problem that the deep neural network cannot perceive the relationship and location information of each trace in the seismic data, so that input data of a general neural network seismic inversion method can only use a fixed observation form, making practical application difficult, the present disclosure realizes a trigonometric function encoding method for an observation system, and adds the trigonometric function encoded location feature for each seismic trace of the actual observation data. This method can adapt the network structure to the input observation data of different observation systems. This makes the observation data in an unsupervised method training set in practical applications come from different projects and use different observation methods, which greatly reduces the limitation on the unsupervised method training set, and helps the unsupervised method to obtain sufficient training set data so as to achieve good effects in practical engineering applications.

In order to make the above objects, features and advantages of the present disclosure more comprehensible, preferred embodiments accompanied with figures are described in detail below.

BRIEF DESCRIPTION OF THE DRAWINGS

The accompanying drawings constituting a part of the present disclosure are used for providing a further understanding of the present disclosure. The schematic embodiments and description of the present disclosure are intended to explain the present disclosure, and do not constitute improper restriction to the present disclosure.

FIG. 5 (a) is a schematic diagram of a geological velocity model used in this embodiment, and FIG. 5 (b) is seismic observation data corresponding to FIG. 5 (a).

DETAILED DESCRIPTION

The present disclosure is further described below with reference to the accompanying drawings and embodiments.

It should be pointed out that the following detailed descriptions are all illustrative and are intended to provide further descriptions of the present disclosure. Unless otherwise specified, all technical and scientific terms used herein have the same meaning as commonly understood by a person of ordinary skill in the art to which the present disclosure belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

Directing at the problems that mapping from observation data to a velocity model in a seismic velocity inversion method has strong non-linearity, an inversion task is high in difficulty, and it is difficult to realize an unsupervised learning algorithm, the present disclosure proposes a multi-scale unsupervised seismic velocity inversion method based on auto encoder for observation data.

In the method, global key information is extracted from seismic data through a plurality of autoencoders, and the trained encoder part is embedded into an inversion network to effectively improve the performance of the inversion network itself. Directing at the problem that an existing seismic velocity deep learning inversion method relies on real velocity data or relatively accurate apriori information of the velocity and is very difficult to be applied in engineering projects, a multi-scale unsupervised loss function matching the inherent features of a neural network is formed based on the global key information extracted from the seismic data by the autoencoder further in combination with the idea of physical law driving to recover the features of a large-scale structure to a fine structure of different scales in a geological model, which realizes a completely unsupervised learning algorithm. Directing at the problem that a current deep neural network cannot perceive the relationship and location information of each trace in the seismic data, which leads to the fixed observation form of the seismic data input into the network, a location code is added to the observation data input into the network to assist the network in perceiving the layout form of an observation system, which facilitates practical engineering application. The method obtains a relatively accurate inversion effect of a seismic velocity model without accurate priori and without a real geological model as a network training label.

The main content of the present disclosure is described below:

A multi-scale unsupervised seismic velocity inversion method based on an autoencoder for observation data includes:

Corresponding geological velocity models are constructed according to the actual geological conditions, corresponding simulated seismic observation data is calculated by numerical simulation, and based on each seismic observation data and the geological velocity model, an unsupervised seismic velocity inversion database is formed.

A plurality of autoencoders are trained by using the simulated seismic observation data, the different autoencoders encode global key information in the seismic observation data into low-dimensional vectors of different lengths, a number of parameters of all the above vectors is less than that of the seismic observation data, and the vector with a smaller number of parameters corresponds to larger-scale information in the velocity model.

A location feature information code is added to each seismic trace of actual observation data, the code is used for determining location information (a location of seismic sources and receivers) of observation data of each trace.

A convolutional-fully connected network is constructed, and each trained encoder part of the autoencoder for observation data is embedded into a front end of the above-mentioned network structure so that the inversion network can effectively extract the global information of the observation data at an input end of the seismic data. The seismic observation data encoded by the location information is input into the convolutional-fully connected network, and a predicted velocity model corresponding to the seismic observation data is output.

A forward modeling network of wave equation is constructed to transform the predicted velocity model into corresponding predicted observation data.

A residual of the predicted observation data and the simulated seismic observation data is calculated. The predicted observation data and the simulated seismic observation data are respectively input into each trained encoder part of the autoencoder for observation data to respectively obtain encoded low-dimensional vectors and calculate a residual of each low-dimensional vector. In addition, basic velocity information is added to the inversion to provide the inversion result of a linear gradient background velocity model constraint network, and calculate a residual of a linear gradient velocity model and a predicted velocity model output by the inversion network.

The above three residuals respectively contain small-scale information, large-scale information of different degrees and basic apriori information, the above three residuals are summed according to the proportion changing with the number of training rounds and then a multi-scale unsupervised loss function is formed, the network is guided to recover different-scale information in the velocity model at different training stages, and parameters of the convolutional-fully connected network are updated by means of gradient pass back of the loss function.

The convolutional-fully connected network with the updated parameters is used to process field observation data to obtain an inversion result.

In a part of embodiments, when the corresponding geological velocity models are constructed according to the actual geological conditions, wavefield simulation is performed for each geological velocity model with a fixed location of seismic sources and receivers, as well as observation time, and wavefield data is recorded at the receiver location to obtain actual seismic data corresponding to the geological velocity models.

In a part of embodiments, actual observation data is encoded by a plurality of regularization autoencoders, an encoder part output of the regularization autoencoders consists of a vector with a number of parameters lower than that of the seismic observation data, and the vector contains global key information in the seismic observation data and corresponds to large-scale information in the velocity model.

In a part of embodiments, referring to a location encoding method of a Transformer model, a trigonometric function encoded location feature is added to each seismic trace of the actual observation data, and the location feature information code is two numerical values solved by a formula composed of a sine-cosine function input through a shot point of the seismic trace and a receiver location and can realize the calibration of any location of seismic sources and receivers.

Certainly, in other embodiments, other location encoding methods may also be used to add the location feature information code.

In a part of embodiments, for each network layer of the forward modeling network of the wave equation, a seismic wavefield of the first two moments is taken as an input, and a wavefield of the next moment and the corresponding observation data are obtained by introducing a seismic source wavefield of the current moment.

In a part of embodiments, in view of the inherent features of the deep learning network itself, that is, the deep learning network tends to learn large-scale structure information in an image first and then gradually recover a small-scale fine structure in the image, a gradually increasing weight coefficient is added to the residual of the observation data, and a gradually decreasing weight coefficient is added to the residual of the low-dimensional vector and the residual of the linear model, so as to guide the network to take large-scale information of an inversion model as a target at the initial stage of training, and take a fine structure of the inversion model as a target at the middle and later stages of the training process. Parameters of the convolutional-fully connected network are updated by means of gradient pass back of the loss function.

Embodiment 1

Figure 1:
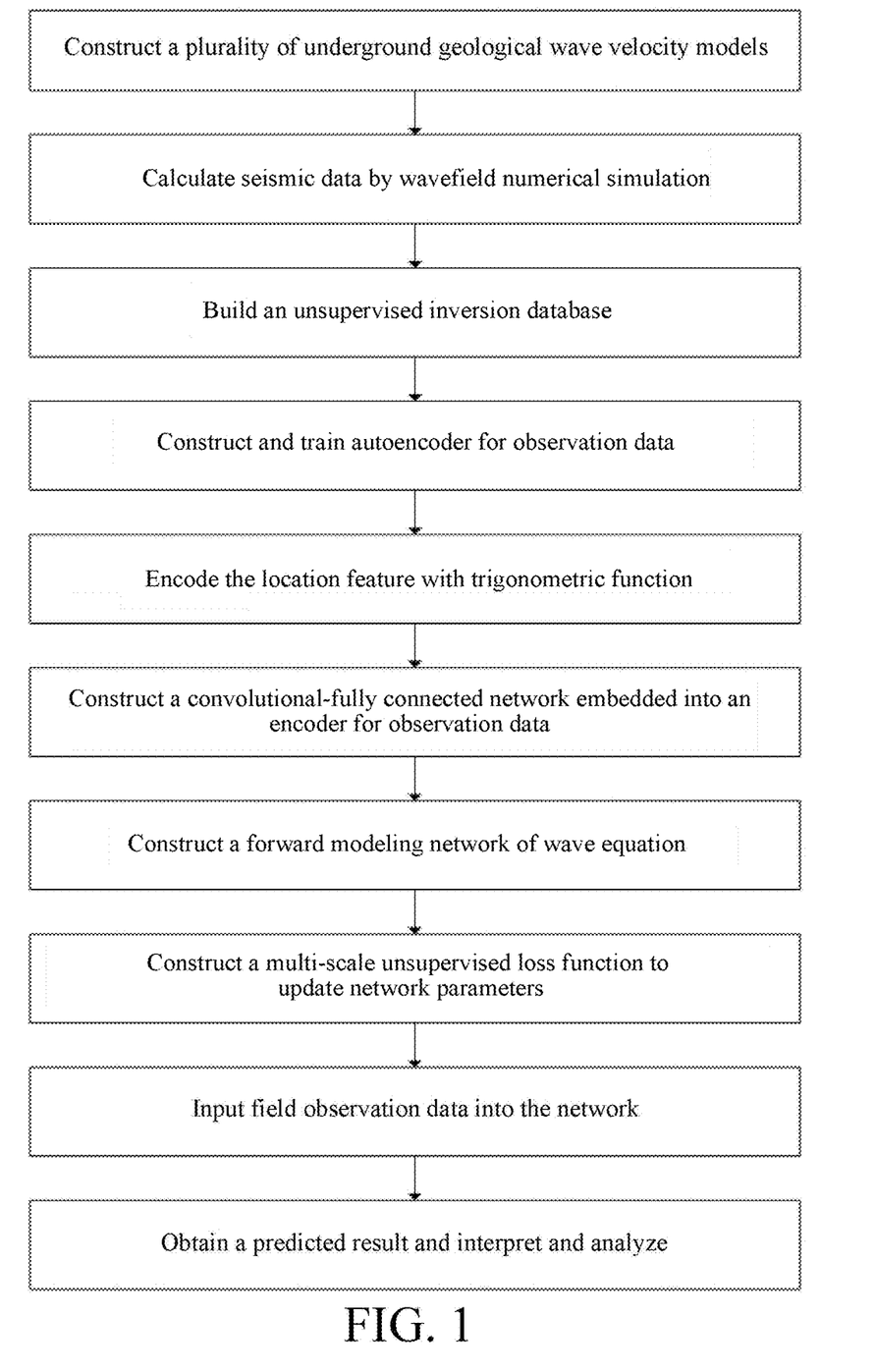
FIG. 1 is a flowchart of a method of this embodiment.

Specifically, a method provided by this embodiment, as shown in FIG. 1 includes:

Step S1: A geological velocity model is obtained by intercepting two-dimensional slices from a three-dimensional SEG/EAGE nappe model published by the Society of Exploration Geophysicists (SEG)/the European Association of Geoscientists & Engineers (EAGE). A corresponding seismic observation data database is obtained by computer numerical simulation.

The nappe model intercepted in this embodiment has dimensions of 1600 m×5000 m and a grid size of 25 m in both the transverse and longitudinal directions. A 50-grid sponge absorption boundary is disposed around the model. The seismic velocity model contains a water layer with a 9-grid depth and the seismic velocity thereof is 1800 m/s. Geological structures under the water layer mainly include folds, faults and the like, and wave velocities thereof are set according to the original SEG/EAGE nappe model, with the model velocity ranging from 1800 m/s to 5500 m/s. With regard to the seismic observation data, this embodiment uses an earth surface observation method, with 21 seismic source points at an interval of 250 m, and 201 receivers at an interval of 25 m, which are uniformly distributed on the first row of grids of the velocity model. A 6 Hz Ricker wavelet seismic source is used for excitation, the unit time step recorded by the receiver is 1 ms, and the total duration is 2 s. The intercepted geological velocity models are subjected to forward modeling according to the constant density acoustic wave equation using a finite difference method to acquire the seismic observation data.

Certainly, in other embodiments, the geological model database can be built by means of other data. Or parameters selected in the establishment process may be converted not according to the parameters provided in the above-mentioned embodiment.

In other embodiments, wavefield simulation is performed for each geological velocity model with a fixed location of seismic sources and receivers, as well as observation time. Wavefield data is recorded at the receiver location to obtain seismic data corresponding to the geological velocity models. An unsupervised inversion database is built together with the geological model database.

Figure 5A:
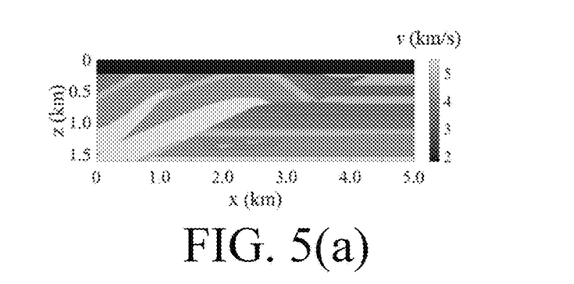
Figure 5B:
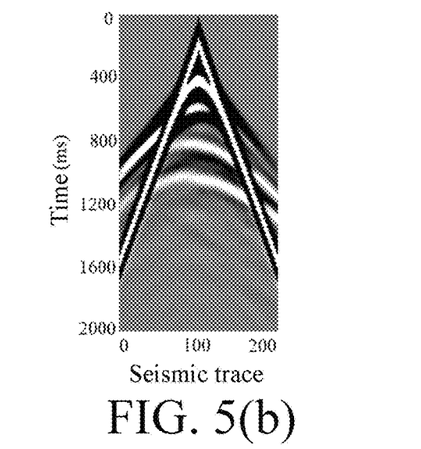

A geological velocity model in the database of this embodiment is as shown in FIG. 5(a), and seismic observation data corresponding thereto is shown in FIG. 5(b).

The geological model database of this embodiment contains 2000 groups of geological velocity models, and forward modeling is performed to obtain observation data. 2000 groups of training data sets, validation sets and test sets of this embodiment are divided into 1200 groups of training data sets, 400 groups of validation sets, and 400 groups of test sets by 3:1:1. All velocity value is normalized into a [0, 1] range and amplitudes in the observation data are normalized into a [−1, 1] range.

Likewise, the above parameters or ratios are in other embodiments.

Figure 2:
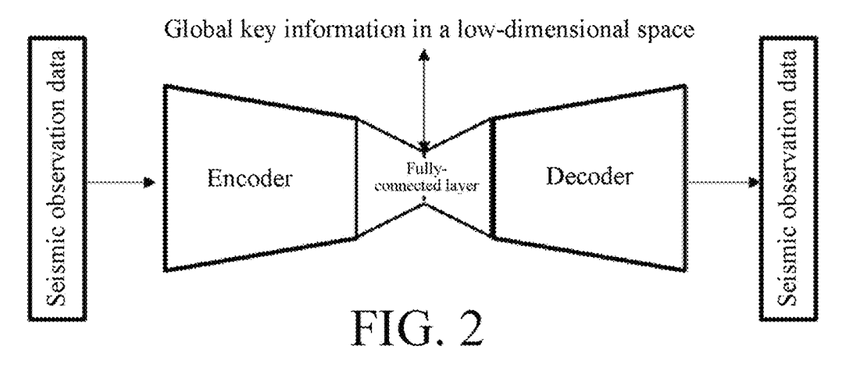
FIG. 2 is a schematic structural diagram of an autoencoder of observation data of this embodiment.

Step S2: as shown in FIG. 2, a plurality of autoencoders for observation data are constructed to complete encoding of global key information in the seismic observation data. In this embodiment, a regularization autoencoder is used to encode the seismic observation data, and the regularization autoencoder includes an encoder and a decoder. Both the encoder and the decoder consist of a multi-layer convolutional structure cascaded in sequence. The two parts are linked via a fully connected layer. A number of parameters of the fully connected layer of different regularization autoencoders are different, but both are less than that of the seismic observation data. An overall structure is symmetrical, and the output of the fully connected layer in the middle is the global key information extracted from the seismic observation data. The regularization autoencoder uses the simulated seismic observation data as both input and output, and trains the network parameters using all the seismic observation data in the above database.

In this embodiment, a trigonometric function encoded location feature is added to each seismic trace of the actual observation data. Referring to a location encoding method of a Transformer network model, the trigonometric function encoded location feature is added to each seismic trace of the actual observation data, and the location feature information code is obtained by the following formula:

$$\vec{l}_n = \begin{cases} \sin(n/10000^{2k/d}), \text{ denotes the location of a shot point} \\ \cos(n/10000^{2k/d}), \text{ denotes the location of a receiver point} \end{cases}$$

in the formula, n is the location of a shot point or receiver point of the seismic trace, d is the dimension of a vector, needs to be divisible by two, and is set as 2 in this embodiment, and k is 0 or 1.

Figure 3:
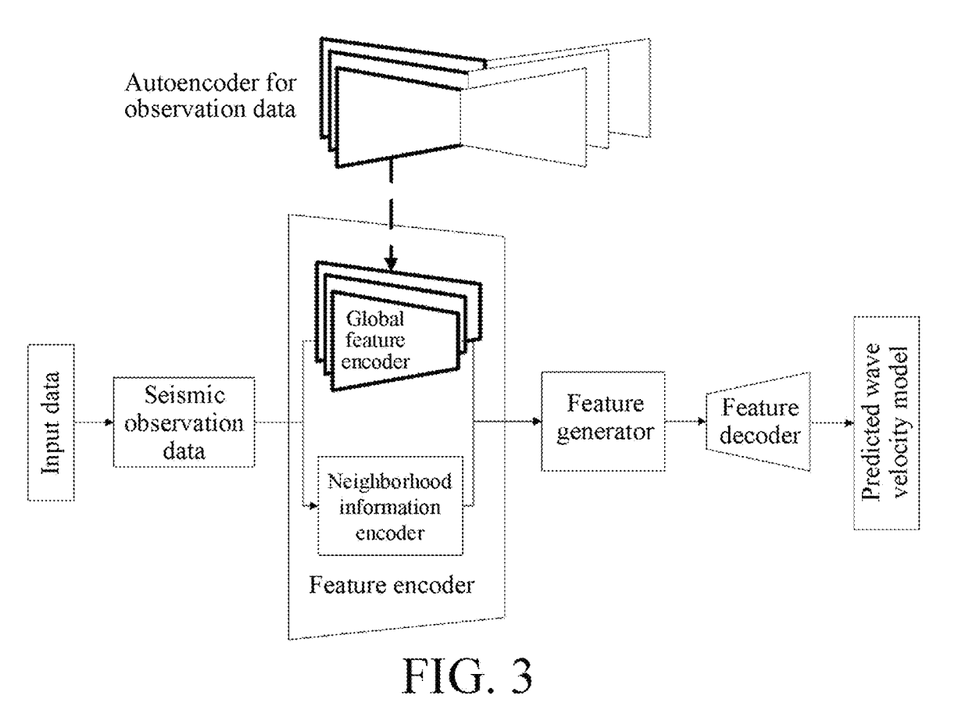
FIG. 3 is a schematic diagram of a convolutional-fully connected network of this embodiment.

Step S3: as shown in FIG. 3, a convolutional-fully connected network applied to unsupervised seismic inversion is constructed, and the convolutional-fully connected neural network is composed of three parts: a feature encoder, a feature generator and a feature decoder.

The feature encoder is composed of two parts: a global feature encoder and a neighborhood information encoder. The global feature encoder is each regularization encoder part of the autoencoder for observation data trained in step S2, the observation data input into the network is respectively input into the above two parts, and outputs of the two parts are input into the feature generator after being spliced. The above two parts extract the neighborhood information of the record of the trace for the residual of the observation data based on the convolution operation of single shot and single trace seismic records and adjacent trace records thereof, and extract the global information of the record of the trace based on the convolution operation of single shot seismic records.

It is to be noted that, network parameters of the global feature encoder do not change due to difference of input data. The whole feature encoder can effectively extract large-scale information (such as a geological structure type, a stratigraphic stratification condition, etc.) reflecting a geological structure and a detailed structure from the residual of the observation data. As described above, the global feature encoder is each encoder part of the autoencoder for observation data. The neighborhood information encoder consists of a 3-layer successively cascaded convolutional structure.

The feature generator consists of 5 fully connected layers, can map enhancement vectors from an encoder network into a high-dimensional feature space, and then is connect to a decoder to complete prediction of a real velocity model. The feature decoder consists of a 6-layer successively cascaded convolutional structure, and the 4th-layer convolutional structure is 4 parallel convolutional layers. An output of the feature generator is the final output of the entire convolutional-fully connected network, i.e. the predicted velocity model.

Step S4: a forward modeling network of wave equation is constructed based on a deep neural network, and forward modeling of a seismic wavefield is performed on a final output of the convolutional-fully connected network so that the seismic observation data corresponding to the predicted velocity model is obtained.

In the time-space domain, a one-dimensional constant density acoustic wave equation is:

$$\frac{\partial^2 u}{\partial t^2} = v^2(z)\frac{\partial^2 u}{\partial z^2} + q(t, z)$$

here, t and z denote time and depth, respectively, u denotes an acoustic wavefield, and v denotes an acoustic velocity. After discretization, the acoustic wave equation can be expressed as:

$$u^{n+1} = Gu^n - u^{n-1} + s^{n+1}$$

here, u represents a discretized acoustic wavefield, G represents a positive operator, s represents a discretized seismic source wavefield, and n represents a certain time moment. The forward modeling process can be decomposed into simple operations such as calculating the Laplace value of the seismic wavefield and adding, subtracting, multiplying and dividing corresponding elements of a matrix. The calculation of the wavefield Laplace value is performed by a convolution operation commonly used in the deep neural network. The seismic wavefield propagation operation at each time step is taken as a layer of deep neural network, the seismic velocity model is taken as a trainable parameter of the deep neural network, and convolution operation in the wavefield propagation process and simple operation between corresponding elements of the matrix are taken as the internal operation process of the network to realize construction of the forward modeling network of the wave equation.

All the above operations have natural parallelism, and the parallel computation of the above forward modeling process is realized based on the deep learning platform Pytorch, which greatly accelerates the seismic forward modeling process.

The loss function of an unsupervised seismic velocity inversion network consists of a loss function $L_d$ of observation data, a loss function $L_l$ of a low-dimensional vector and a loss function $L_m$ of a linear gradient velocity model, with $L_d$ defined as the mean-square error (MSE) on the observation data:

$$L_d = \frac{\|d_{syn} - d_{obs}\|^2}{2 \cdot nt \cdot nr \cdot ns}$$

$d_{syn}$ and $d_{obs}$ respectively denote real observation data and simulated observation data of a predicted model output by the unsupervised inversion network, and nt, nr and ns respectively denote the time step number of the observation data, the number of receivers and the number of seismic sources. The loss function of the low-dimensional vector may be defined as:

$$L_l = \sum_i \sigma_i \frac{\|E_i(d_{syn}) - E_i(d_{obs})\|^2}{2l_i}$$

$E_i(d_{syn})$ denotes the low-dimensional vector output after the simulated observation data of the synthetic predicted model is input into each encoder part of the autoencoder, $E_i(d_{obs})$ denotes the low-dimensional vector output after actual observation data of a real geological model is input into each encoder part of the autoencoder, l is the amplitude of the low-dimensional vector, and $\sigma_i$ is a varying coefficient to be used for controlling the opportunity when different low-dimensional vectors play a role. In general, the smaller the vector parameter is, the larger the value of $\sigma_i$ is in the initial stage of network training, and the smaller the value of $\sigma_i$ is in the later stage. The loss function of the linear gradient velocity model can be defined as:

$$L_m = \frac{\|m_{est} - m_0\|^2}{2 \cdot nx \cdot nz}$$

here, $m_{est}$ denotes a predicted velocity model output by the unsupervised inversion network, $m_0$ denotes the linear gradient velocity model, and nx and nz denote the lateral and longitudinal magnitudes of the velocity model. The overall objective function can be expressed as:

$$L = \alpha L_d + \beta L_l + \gamma L_m,$$

$m_0$ provides the apriori knowledge of the background velocity and plays a certain guiding role in the early stage of training. However, as the network training process progresses gradually, the prediction result of network output gradually fits the large-scale information in the velocity model, which will become a negative role, and the low-dimensional vector loss function will play a key guiding role. In the later stage of network training, the prediction result of network output gradually fits the fine structure in the velocity model, and the loss function of the observation data plays a dominant role. A coefficient $\alpha$ before the above three loss functions is the largest in the early stage of network training, $\beta$ is the largest in the middle stage of network training, and $\gamma$ is the largest in the late stage of network training.

Figure 4:
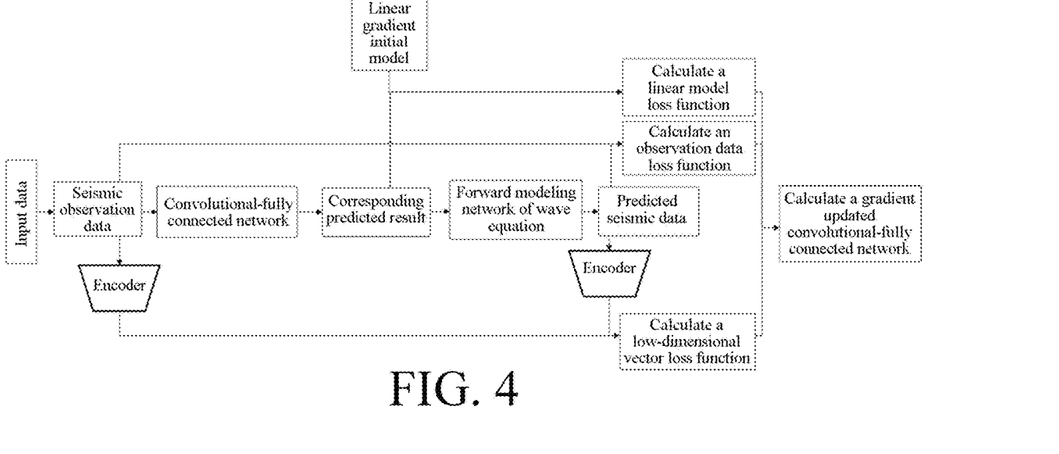
FIG. 4 is a schematic diagram of network training of multi-scale unsupervised seismic velocity inversion based on an autoencoder for observation data of this embodiment.

Step S5: a convolutional-fully connected network as shown in FIG. 4 is trained. The network training of this embodiment employs an Adam optimizer for a total of 100 rounds of training. The learning rate decreases exponentially from $5 \times 10^{-5}$ to 0, Batchsize is set to 8. For each velocity model in Batchsize, seismic sources at 5 locations are randomly selected as inputs of the forward modeling network of the wave equation, and the loss function of the observation data is calculated. The seismic wavefield forward modeling based on the forward modeling network of the wave equation adopts the finite difference scheme of temporal second order and spatial tenth order. Further, in the first 40 rounds of network training, a loss function based on the background velocity $m_0$ is employed and $\lambda$ is set to linearly decrease from 1 to 0. The calculation of this experiment is based on 4 NVIDIA TITAN RTX graphics cards of 24 G video memory, each card containing 4608 stream processing units. Network parameters corresponding to the lowest loss function of observation data on the validation set will be saved for subsequent experiments on the test set.

Figure 6:
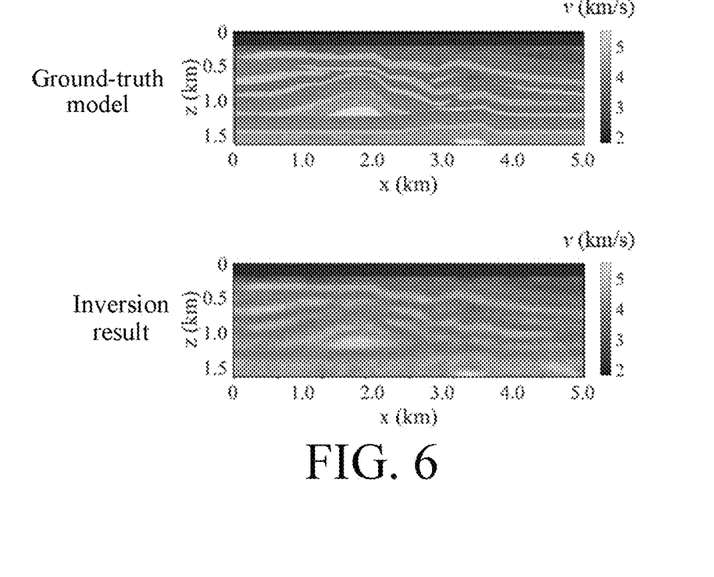
FIG. 6 is an unsupervised learning seismic velocity inversion result of this embodiment.

Step S6: the inversion effect of the trained convolutional-fully connected network is tested on the test set. Some of the results on the test set are as shown in FIG. 6. The test results show that under the condition that there is no real velocity model as a label, the unsupervised deep learning method based on seismic wavefield forward modeling can effectively train the velocity inversion network and can relatively accurately reflect the velocity distribution condition of the underground medium. Regardless of the location and shape of the geological structure or the change trend of velocity distribution, the method can fit the real velocity model well.

Embodiment 2

A multi-scale unsupervised seismic velocity inversion system based on an autoencoder for observation data includes:

an inversion database constructing module, configured to construct the corresponding geological velocity models according to the actual geological conditions, calculate corresponding seismic observation data, and based on each seismic observation data and the geological velocity model, form an unsupervised seismic velocity inversion database;

an autoencoder for observation data module, configured to train a plurality of autoencoders by using the simulated seismic observation data, the different autoencoders encoding global key information in the seismic observation data into low-dimensional vectors of different lengths;

a predicted velocity model constructing module, configured to add a location feature information code to each seismic trace of actual observation data, the code being used for determining location information of observation data of each trace; construct a convolutional-fully connected network, and embed each trained encoder part of the autoencoder for observation data into a front end of the above-mentioned network structure; input the seismic observation data encoded by the location information into the convolutional-fully connected network, and output a predicted velocity model corresponding to the seismic observation data;

a transforming module, configured to construct a forward modeling network of wave equation to transform the predicted velocity model into corresponding seismic observation data;

a parameter updating module, configured to calculate a residual of predicted observation data and the simulated seismic observation data; respectively input the predicted observation data and the simulated seismic observation data into each trained encoder part of the autoencoder for observation data to respectively obtain encoded low-dimensional vectors and calculate a residual of each low-dimensional vector; calculate a residual of a linear gradient velocity model and the predicted velocity model output by an inversion network; sum the above three residuals according to the proportion changing with the number of training rounds and then forming a multi-scale unsupervised loss function, guide the network to recover different-scale information in the velocity model at different training stages, and update parameters of the convolutional-fully connected network by means of gradient pass back of the loss function; and a velocity inversion module, configured to use the convolutional-fully connected network with the updated parameters to process field observation data to obtain an inversion result.

A person skilled in the art should understand that the embodiments of the present disclosure may be provided as a method, a system, or a computer program product. Therefore, the present disclosure may be in a form of complete hardware embodiments, complete software embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a dedicated computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A multi-scale unsupervised seismic velocity inversion method based on an autoencoder for observation data, comprising:

constructing a corresponding geological velocity model according to the actual geological conditions, calculating corresponding simulated seismic observation data by numerical simulation, and based on each seismic observation data and the geological velocity model, forming an unsupervised seismic velocity inversion database;

training a plurality of autoencoders by using the simulated seismic observation data, the different autoencoders encoding global key information in the seismic observation data into low-dimensional vectors of different lengths;

adding a location feature information code to each seismic trace of actual observation data, the code being used for determining location information of seismic observation data of each trace;

constructing a convolutional-fully connected network, embedding each trained encoder part of the autoencoder for observation data into a front end of the above-mentioned network structure, so that an inversion network can effectively extract global information of the observation data at an input end of the seismic data, inputting the seismic observation data encoded by the location feature information into the convolutional-fully connected network, and outputting a predicted velocity model corresponding to the seismic observation data;

constructing a forward modeling network of wave equation to transform the predicted velocity model into corresponding predicted observation data;

calculating a residual of the predicted observation data and the simulated seismic observation data; respectively inputting the predicted observation data and the simulated seismic observation data into each trained encoder part of the autoencoder for observation data to respectively obtain encoded low-dimensional vectors and calculate a residual of each low-dimensional vector; calculating a residual of a linear gradient velocity model and the predicted velocity model output by the inversion network;

summing the three residuals according to the proportion changing with the number of training rounds and then forming a multi-scale unsupervised loss function, guiding the network to recover different-scale information in the velocity model at different training stages, and updating parameters of the convolutional-fully connected network by means of gradient pass back of the loss function; and using the convolutional-fully connected network with the updated parameters to process field observation data to obtain an inversion result.

2. The multi-scale unsupervised seismic velocity inversion method based on the autoencoder for the observation data according to claim 1, wherein when the corresponding geological velocity models are constructed according to the actual geological conditions, wavefield simulation is performed for each geological velocity model with a fixed location of seismic sources and receivers, as well as observation time, and wavefield data is recorded at the receiver location to obtain actual seismic data corresponding to the geological velocity models.

3. The multi-scale unsupervised seismic velocity inversion method based on the autoencoder for the observation data according to claim 1, wherein a number of parameters of all the low-dimensional vectors is less than that of the seismic observation data, and the vector with a smaller number of parameters corresponds to larger-scale information in the velocity model.

4. The multi-scale unsupervised seismic velocity inversion method based on the autoencoder for the observation data according to claim 1, wherein actual observation data is self-encoded by a plurality of regularization autoencoders, an encoder part output of the regularization autoencoder consisting of a vector with a number of parameters lower than that of the seismic observation data, and the vector containing global key information in the seismic observation data and corresponding to large-scale information in the velocity model.

5. The multi-scale unsupervised seismic velocity inversion method based on the autoencoder for the observation data according to claim 1, wherein a trigonometric function encoded location feature is added to each seismic trace of the actual observation data, the location feature information code being two numerical values solved by a formula composed of a sine-cosine function input through a shot point of the seismic trace and a receiver location and can realize the calibration of any location of seismic sources and receivers.

6. The multi-scale unsupervised seismic velocity inversion method based on the autoencoder for the observation data according to claim 1, wherein the convolutional-fully connected network comprises a feature encoder, a feature generator and a feature decoder, each encoder part of the autoencoder for observation data forming the feature encoder together with other network structures, and the network being used for establishing mapping of observed seismic observation data to the velocity model.

7. The multi-scale unsupervised seismic velocity inversion method based on the autoencoder for the observation data according to claim 6, wherein the encoder comprises a global feature encoder and a neighborhood information encoder, the observation data input into the network is respectively input to the above two parts, and outputs of the two parts are input to the feature generator after being spliced; the global feature encoder is each encoder part of the autoencoder for observation data, and the neighborhood information encoder consists of a 3-layer successively cascaded convolutional structure;

or the feature generator comprises 5 fully connected layers, an input of the feature generator being an output of the encoder, and an output of the feature generator being an input of the feature decoder;

or the feature decoder comprises a 6-layer successively cascaded convolutional structure, wherein the 4th-layer convolutional structure is 4 parallel convolutional layers.

8. The multi-scale unsupervised seismic velocity inversion method based on the autoencoder for the observation data according to claim 1, wherein in the specific process of constructing the forward modeling network of the wave equation to transform the predicted velocity model into corresponding seismic observation data: constructing the forward modeling network of the wave equation based on a deep neural network, and performing forward modeling of a seismic wavefield on a final output of the convolutional-fully connected network so that the seismic observation data corresponding to the predicted velocity model is obtained.

9. The multi-scale unsupervised seismic velocity inversion method based on the autoencoder for the observation data according to claim 1, wherein the specific process of constructing the forward modeling network of the wave equation based on the deep neural network comprises: in a time-space domain, discretizing a constant density acoustic wave equation, the process of the seismic wavefield propagating with time being based on the iterative process of a forward operator in the discretized equation; and taking seismic wavefield propagation operation at each time step as a layer of deep neural network, taking the seismic velocity model as a trainable parameter of the deep neural network, and taking convolution operation in the wavefield propagation process and operation between corresponding elements of a matrix as the internal operation process of the network to realize construction of the forward modeling network of the wave equation.

10. The multi-scale unsupervised seismic velocity inversion method based on the autoencoder for the observation data according to claim 1, wherein a weight coefficient changing with the number of training rounds is added to the residual of the observation data, the residual of the low-dimensional vector and the residual of the linear model constituting the loss function; and the three residuals respectively contain small-scale information, large-scale information of different degrees and basic apriori information.

11. The multi-scale unsupervised seismic velocity inversion method based on the autoencoder for the observation data according to claim 10, wherein a gradually increasing weight coefficient is added to the residual of the observation data, and a gradually decreasing weight coefficient is added to the residual of the low-dimensional vector and the residual of the linear model, so as to guide the network to take the large-scale information of an inversion model as a target at the initial stage of training, and take a fine structure of an inversion model as a target at the middle and later stages of the training process.

12. A computer-readable storage medium, wherein a plurality of instructions are stored therein, the instruction being adapted to be loaded by a processor of a terminal device and to perform the steps of the method according to claim 1.

13. A terminal device, comprising a processor and a computer-readable storage medium, the processor being used for implementing various instructions; and the computer-readable storage medium being used for storing a plurality of instructions, and the instruction being adapted to be loaded by the processor and to perform the steps of the method according to claim 1.

14. A multi-scale unsupervised seismic velocity inversion system based on an autoencoder for observation data, comprising:

an inversion database constructing module, configured to construct a corresponding geological velocity model according to the actual geological conditions, calculate corresponding seismic observation data, and based on each seismic observation data and the geological velocity model, form an unsupervised seismic velocity inversion database;

an autoencoder for observation data module, configured to train a plurality of autoencoders by using the simulated seismic observation data, the different autoencoders encoding global key information in the seismic observation data into low-dimensional vectors of different lengths;

a predicted velocity model constructing module, configured to add a location feature information code to each seismic trace of actual observation data, the code being used for determining location information of observation data of each trace; construct a convolutional-fully connected network, and embed each trained encoder part of the autoencoder for observation data into a front end of the above-mentioned network structure;

input the seismic observation data encoded by the location information into the convolutional-fully connected network, and output a predicted velocity model corresponding to the seismic observation data;

a transforming module, configured to construct a forward modeling network of wave equation to transform the predicted velocity model into corresponding seismic observation data;

a parameter updating module, configured to calculate a residual of predicted observation data and the simulated seismic observation data; respectively input the predicted observation data and the simulated seismic observation data into each trained encoder part of the autoencoder for observation data to respectively obtain encoded low-dimensional vectors and calculate a residual of each low-dimensional vector; calculate a residual of a linear gradient velocity model and the predicted velocity model output by an inversion network; sum the above three residuals according to the proportion changing with the number of training rounds and then forming a multi-scale unsupervised loss function, guide the network to recover different-scale information in the velocity model at different training stages, and update parameters of the convolutional-fully connected network by means of gradient pass back of the loss function; and a velocity inversion module, configured to use the convolutional-fully connected network with the updated parameters to process field observation data to obtain an inversion result.

* * * * *